March 27, 1928.  1,663,546
J. GEIER
CONVERTIBLE LEVEL AND TRANSIT
Filed Feb. 26, 1926  2 Sheets-Sheet 1
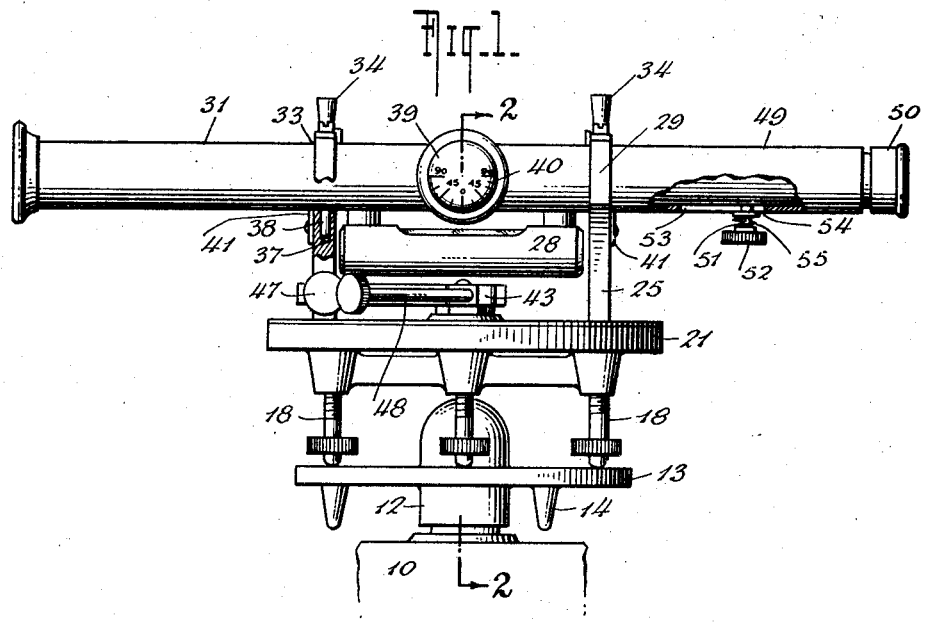
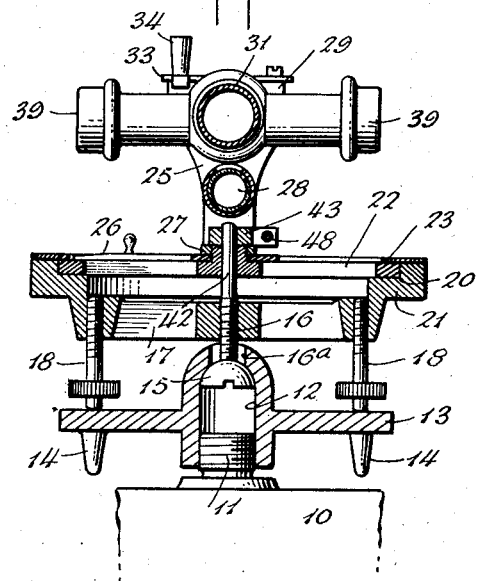
INVENTOR
JAMES GEIER
BY Richards & Geier
ATTORNEYS March 27, 1928. 1,663,546
J. GEIER
CONVERTIBLE LEVEL AND TRANSIT
Filed Feb. 26, 1926 2 Sheets-Sheet 2
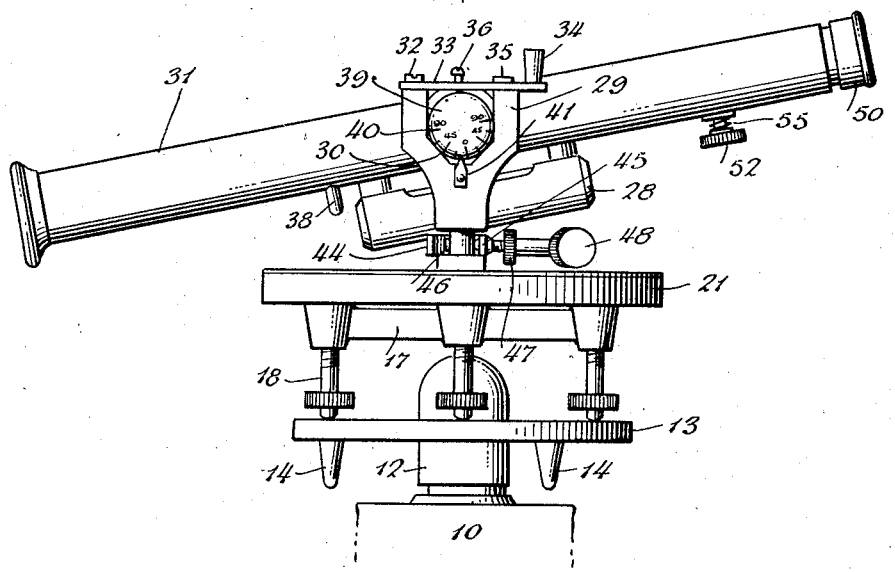
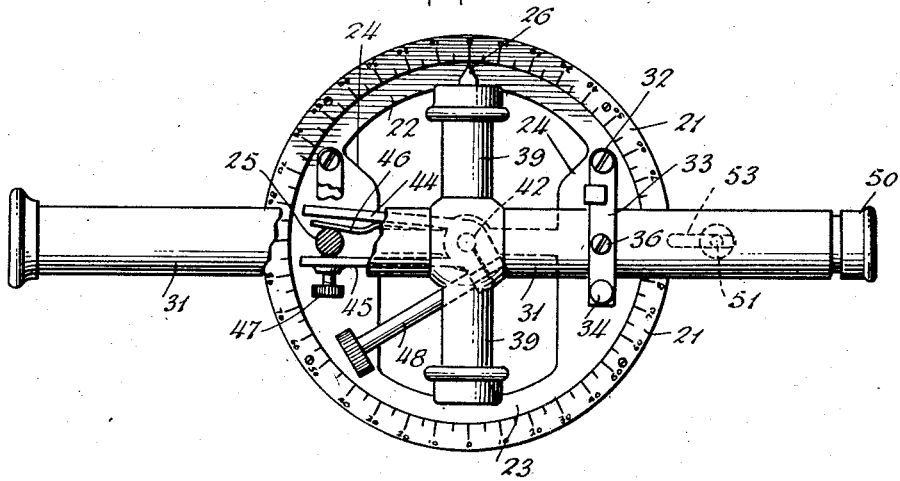
INVENTOR
JAMES GEIER
BY Richards & Geier
ATTORNEYS Patented Mar. 27, 1928.

1,663,546

UNITED STATES PATENT OFFICE.

JAMES GEIER, OF TROY, NEW YORK.

CONVERTIBLE LEVEL AND TRANSIT.

Application filed February 26, 1926, Serial No. 90,746, and in Canada February 27, 1925.

This invention relates to improvements in measuring instruments, and has particular reference to a convertible Y level and transit such as disclosed in my United States Patent No. 1,533,545, issued April 14, 1925.

An object of the invention is to secure a micrometer adjustment of the telescope of the instrument in a horizontal plane.

Another object is to simplify the adjustment of the objective end of the telescope by providing means which will effect a frictional contact between the inner and outer members of the telescope sufficient to permit of an easy and quick adjustment of one of said members and at the same time maintain said member in its adjusted position.

A further object is to provide a simple and durable construction which, while capable of being manufactured and sold at a very low price, will provide an accurate instrument of a neat and attractive appearance.

The above and other objects will appear more clearly from the following detailed description, when taken in connection with the accompanying drawings, which illustrate a preferred embodiment of the inventive idea.

In the drawings—

Figure 1 is a side elevation of an instrument constructed in accordance with the principles of my invention, showing the telescope in position for use as a level.

Figure 2 is a section on the line 2—2 of Figure 1.

Figure 3 is a view similar to Figure 1, showing the telescope in position for use as a transit.

Figure 4 is a plan view of Figure 1.

As shown in the drawings the numeral 10 indicates the top of a tripod which is provided with the usual threaded stud 11, adapted to be secured within the threaded socket 12, depending from the center of the leveling plate 13. The leveling plate 13 is provided with a plurality of (preferably three) supporting legs 14 to form a trivet upon which the plate and instrument is adapted to be supported when the instrument is used in places where a tripod cannot be placed conveniently.

The upper face of the plate 13 is provided at its central part with an upwardly extending boss which forms a continuation of the socket 12, and which terminates in a rounded surface against which the round head 15 of a screw 16 contacts. The screw 16 passes through an aperture 16$^a$ in said boss, and engages within a threaded aperture of the base 17 and serves to secure said base 17 to the plate 13. The rounded configuration of the screw head 15 permits the plate and base to be held securely in engagement while allowing the base to be adjusted to a level position by means of the leveling screws 18.

The base 17 is provided with a suitable recess or race 20 formed in the annular plate 21, which plate is either formed integral with or securely fastened to said base, and a vernier scale is provided upon said plate. A platform 22 having an annular portion 23 rotatably mounted within the race 20 is provided with a pair of side cross bars 24 from which the telescope standards 25 extend upwardly, and has an indicating pointer 26 secured to the center thereof by any suitable means such as the nut 27. A spirit level 28, which is secured to the telescope 31 is so proportioned and arranged that it will lie between the standards 25 when the instrument is used as a level as shown in Figure 1.

Each of the standards 25 terminates at its upper extremity in a Y fork 29, the lower ends of the arms of said fork presenting the inclined faces of V-ways 30 against which the body of the telescope 31 rests when the instrument is used as a level, and the upper end of one of said fork arms has pivotally secured thereto, as at 32, one end of a retaining plate 33. The other end of the retaining plate is provided with a finger grip 34, adapted to be grasped to swing the plate into or out of engagement with a spring metal retaining clip 35 and a clamping screw 36 is mounted in the center of said plate to hold the telescope firmly in contact with the V-ways 30 when the plates 33 are swung to operative position.

One of the standards 25 as clearly shown in Figure 1, is provided with an aperture 37, in which a dowel pin 38 projecting laterally from the telescope 31, is adapted to engage when the telescope is inserted in the standards for use as a level.

A pair of flanged trunnions 39 are rigidly secured to the telescope, preferably centrally of the ends thereof, and project laterally from the sides of said telescope a sufficient distance to engage within the forked arms of the standards 25, and the diameter of said trunnions is exactly equal to the diameter of those portions of the telescope which seat within said standards. The outer end of each of the trunnions 39 is provided with a scale 40 properly calibrated to indicate degrees and associated with each of said scales is an indicator or pointer 41 carried by an adjacent standard 25 so that when the telescope is in the position shown in Figure 3 and is adjusted vertically about the trunnions as pivots the degree of inclination of the telescope may be readily ascertained.

As will be clearly seen from Figures 1 and 4 of the drawings, the standards 25 are located entirely within the vernier scale so that when the instrument is used as a level the outer ends of the trunnions fall well within the inner circumference of the vernier and consequently said trunnions will permit a clear, unobstructed view of the vernier when horizontal angles are to be read.

In order that a micrometer adjustment of the telescope in a horizontal plane may be obtained the screw 16 is provided with a post 42 which extends upwardly therefrom and through an opening formed centrally in the platform 22. A member 43 including the diverging arms 44 and 45 is mounted upon the upper end of the post 42 with said arms extending outwardly from the post in a horizontal plane and adapted to receive a reduced portion of one of the standards 25 therebetween, as clearly shown in Figure 4. The arm 44 carries a leaf spring 46 which engages said portion of the standard and the arm 45 carries a set screw 47 which also engages said portion at a point diametrically opposite the spring 46. The member 43 is split, as best indicated in dotted lines in Figure 4, and the split portions thereof are engaged by a tightening screw 48 which is utilized to secure the member 43 upon the post 42 so that the member will be held in a rigid position. When making a major adjustment of the telescope with respect to the vernier scale 21 the screw 48 is loosened so that the member 43 will rotate about the post 42 when the platform 22 is rotated, the rotation of the member 43 being accomplished by reason of the engagement of the spring 46 and said screw 47 with the standard 25. When the major adjustment is completed the screw 48 is operated to tighten the member 43 about the post 42 so as to prevent any further rotation thereof and the set screw 47 is then turned to either exert a pressure on the standard 25, or move away therefrom. In the former case, the arm 45 being now rigid, the pressure on the standard 25 will cause it, together with the platform 22, to move in a clockwise direction, as viewed in Figure 4. If the set screw is turned in an opposite direction the spring 46 will exert sufficient pressure upon the standard 25 to cause the same and said platform to move in an opposite direction. In this manner a very minute adjustment with respect to the vernier scale may be obtained.

The telescope 31 consists of the outer sleeve member 49 and the inner member 50 which slides within the member 49 and forms the objective piece of the telescope, that is, the piece nearest the object which is being viewed through the telescope. To simplify the adjustment of the member 50 and to frictionally maintain the same in its adjusted positions said member carries intermediate its ends a stud 51 provided with a head 52, said stud extending through an elongated slot 53 formed in the member 49. A washer 54 is mounted upon the stud 51 to engage the outer member 49 and interposed between the head 52 and said washer is a small coil spring 55 which exerts sufficient pressure upon the washer 54 to create a frictional contact between said washer and the member 49, so that the member 50 will be frictionally held in any adjusted position in the member 49.

The operation of the instrument will be readily understood, the telescope being placed within the standards 25 in the position shown in Figures 1 and 4, with the dowel 38 in engagement with the aperture 37, when the device is used as a level.

In this position of the parts it will be noted that the standards 25 are placed sufficiently far apart to allow the spirit level 28 to extend between the standards, and that as the standards are located entirely within the vernier scale the trunnions 39 will not interfere with or obstruct the view of the vernier scale. As there are no additional standards between the standards 25, the space between the standards is clear and unobstructed, therefore the telescope may be rotated upon its longitudinal axis whenever it is necessary or desirable to check the adjustment of the level with respect to the standard; this rotation of the telescope being accomplished by removing the dowel pin 38, or by placing the telescope in a different position longitudinally of said standards, which may readily be done because the telescope is of the same diameter throughout substantially its entire length. When it is desired to convert the instrument to a transit, it is only necessary to swing the retaining plates 33 to inoperative position out of engagement with the telescope body, lift the telescope from the standards, place the trunnions 39 within the standards and swing the plates 33 back into engagement with the clips 35. When it is desired to use the trivet instead of a tripod support for the instrument, it is only necessary to detach the tripod and legs 14 formed upon the leveling plate 13, enabling said plate to be used directly as a trivet.

It will thus be seen that with an instrument constructed in accordance with the principles herein described, there are no extra parts required to be carried or to be detached or replaced, that the operation of converting the instrument for the various uses for which it is adapted is reduced to its maximum simplicity and that such operation may be performed in an instant.

While I have described the spirit level 28 as secured to the telescope, it will be understood that if desired the level can be secured to the platform 22.

What is claimed is:

1. A convertible level and transit including a base, a platform rotatable with respect thereto and having a standard, a telescope supported by said standard, a micrometer device carried by said base and including arms arranged on opposite sides of said standard, and means carried by said arms and engageable with said standard for effecting minute adjustments of said platform and telescope relative to said base.

2. A convertible lever and transit including a base having an annular vernier scale thereon, a platform mounted upon said base and rotatable with respect to said vernier scale, standards carried by said platform, a telescope capable of being seated in said standards for use as a level and having trunnions extending laterally from the telescope and also capable of engagement in said standards to permit of movement of the telescope relative to the base for use as a transit, and a micrometer device capable of being fixed with respect to said base and engageable with one of said standards for effecting minute adjustments of said platform relative to said vernier scale.

3. A convertible level and transit including a base having an annular vernier scale thereon, a platform mounted upon said base and rotatable with respect to said vernier scale, standards carried by said platform, a telescope capable of being seated in said standards for use as a level and having trunnions extending laterally from the telescope and also capable of engagement in said standards to permit of movement of the telescope relative to the base for use as a transit, a micrometer device carried by said base and including arms arranged on opposite sides of one of said standards, and means carried by said arms and engageable with said standard for effecting minute adjustments of said platform relative to said vernier scale.

4. A convertible level and transit including a base having a post extending therefrom, a platform rotatable relative to said base and having a standard, a telescope supported by said standard and movable with said platform, a micrometer device supported upon said post and having arms arranged on opposite sides of said standards, a spring carried by one of said arms and contacting said standard, a set screw carried by said other arm and also contacting said standard, a set screw carried by said other arm and also contacting said standard and cooperating with said spring for making minute adjustments of said platform and telescope relative to said base, and means for rigidly securing said micrometer device to said post during the making of said minute adjustments.

5. A convertible level and transit including a base, a platform rotatable relative thereto, a standard extending from said platform and capable of supporting a telescope, a micrometer device having adjusting elements engageable on opposite sides of said standard, and means to fixedly secure said device to said base so that a manipulation of one of said adjusting elements will adjust said platform and telescope relative to said base.

6. A convertible level and transit including a base, a platform rotatable relative to said base, a standard extending from said platform for supporting a telescope, a micrometer device including a spring and an adjusting screw engageable on opposite sides of said standard and said screw being operable when the device is fixed to said base to adjust said platform in either direction relative to the base, and means to fix said micrometer device to said base.

7. A convertible level and transit including a base, a platform rotatable relative thereto, standards extending from said base for supporting a telescope, and a micrometer device fixed to said base and having contact with one of said standards so that when said device is operated its contact with said standard will adjust said platform relative to said base.

In testimony whereof I have affixed my signature.

JAMES GEIER.